United States Patent
Lu

(10) Patent No.: US 7,496,774 B2
(45) Date of Patent: Feb. 24, 2009

(54) METHOD AND SYSTEM FOR GENERATING CLOCKS FOR STANDBY MODE OPERATION IN A MOBILE COMMUNICATION DEVICE

(75) Inventor: Paul Lu, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 469 days.

(21) Appl. No.: 10/932,234

(22) Filed: Sep. 1, 2004

(65) Prior Publication Data

US 2005/0273637 A1    Dec. 8, 2005

Related U.S. Application Data

(60) Provisional application No. 60/577,006, filed on Jun. 4, 2004.

(51) Int. Cl.
  *G06F 1/00*      (2006.01)
  *G11C 5/14*      (2006.01)
  *H04B 1/38*      (2006.01)
(52) U.S. Cl. .................... 713/322; 365/229; 455/574
(58) Field of Classification Search .............. 713/322, 713/320, 501, 502; 365/227, 229; 342/357.12
  See application file for complete search history.

(56) References Cited

U.S. PATENT DOCUMENTS

| | | | |
|---|---|---|---|
| 5,337,284 A * | 8/1994 | Cordoba et al. ............ 365/227 |
| 5,774,701 A * | 6/1998 | Matsui et al. ............... 713/501 |
| 5,903,746 A * | 5/1999 | Swoboda et al. ............ 713/501 |
| 5,973,617 A * | 10/1999 | Reichmeyer et al. ... 340/825.71 |
| 6,735,454 B1 * | 5/2004 | Yu et al. ..................... 455/574 |
| 6,937,187 B2 * | 8/2005 | van Diggelen et al. . 342/357.12 |
| 7,042,278 B2 * | 5/2006 | Ikoma et al. ................ 327/538 |
| 7,210,054 B2 * | 4/2007 | Jahagirdar et al. .......... 713/502 |

FOREIGN PATENT DOCUMENTS

JP    11167441 A  *  6/1999

\* cited by examiner

*Primary Examiner*—Suresh K Suryawanshi
(74) *Attorney, Agent, or Firm*—McAndrews, Held & Malloy, Ltd.

(57) ABSTRACT

Reducing power while in standby mode may comprise monitoring for an occurrence of at least one event requiring a transition out of a standby mode while utilizing a lower frequency, less accurate, and low power standby clock signal while operating in the standby mode. After receiving the occurrence of the event, an identity of the received event may be determined. In response to receiving the event, based on the determined identity of the event, a first and/or a second clock signal may be enabled, which has higher frequency and better accuracy and consumes more power than the standby clock signal. If the first and/or second clock signal is enabled, they may be disabled in order to re-enter the standby mode, which utilizes the standby clock signal while in standby mode.

27 Claims, 3 Drawing Sheets

METHOD AND SYSTEM FOR GENERATING CLOCKS FOR STANDBY MODE OPERATION IN A MOBILE COMMUNICATION DEVICE

CROSS-REFERENCE TO RELATED APPLICATIONS/INCORPORATION BY REFERENCE

This application makes reference to, claims priority to and claims the benefit of U.S. Provisional Application No. 60/577,006, filed on Jun. 4, 2004).

The above referenced application is hereby incorporated herein by reference in its entirety.

FIELD OF THE INVENTION

Certain embodiments of the invention relate to controlling timing to reduce power consumption in communication devices. More specifically, certain embodiments of the invention relate to a method and system for generating clocks for standby mode operation in a mobile communication device.

BACKGROUND OF THE INVENTION

Mobile communication devices generally transmit data in a bursty manner. In this regard, there are periods when there is no transmission and the device is quiet or inactive and others periods when there is a burst of communication followed again by a period of inactivity. These periods of bursts may occur during time slots or intervals when a mobile device may be authorized to access a communication channel. In order to effectively maximize use of channel bandwidth, while at the same time permit a plurality of access devices to share the bandwidth, very stringent timing requirements must be maintained. In some mobile communication devices, for example, timing requirements may be supplied and maintained by a voltage controlled crystal oscillator (VCXO). For example, in GSM, a voltage controlled crystal oscillator may be utilized to generate a very accurate 13 MHz clock. By fine-tuning a voltage of the VCXO, an output frequency of the VCXO may be more accurately controlled. This fine-tuning is often required in order to provide synchronization with the network.

FIG. 1 is a block diagram of an exemplary system that may be utilized to minimize the amount of power that is consumed. Referring to FIG. 1, there is shown an integrated circuit or chip 102 and an external voltage controlled crystal oscillator (VCXO) 106. The chip 102 may comprise a phase lock loop (PLL) 104, which is coupled to a plurality of on-chip devices D1, D2, D3 and D4. One of the on-chip devices, for example, D1, may be a main processor. Devices D2, D3 and D4 may be co-processors or accelerators. Devices D5 and D6 may be network interface modules and device D7 may be user interface modules, for example. The phase lock loop 104 may be utilized to generate a high frequency clock that is used to handle the demanding processing requirements during burst periods. The frequency of the phase lock loop 104 may be, for example, 156 MHz.

During normal operation, the VCXO 106 supplies a reference clock (C0) signal 110 to main PLL 104. The main PLL 104 then generates a plurality of output clocks that supplies clocking to on-chip devices D1, D2, D3, and D4. In this arrangement, a significant amount of power is consumed by the PLL 104 and on-chip devices D1, D2, D3 and D4. During standby mode when on-chip devices D1, D2, D3 and D4 are inactive, the main PLL 104 may be disabled and the reference clock 108 may be supplied to devices D5, D6 and D7. The reference clock 108 is derived from the VCXO 106 and is tapped off from the reference clock (C0) signal 110 that is supplied to the main PLL 104. Notwithstanding, even though the main PLL 104 is disabled, a significant amount of power is still drawn by the external voltage controlled crystal oscillator (VCXO) 106 during stand-by mode. This causes the batteries in mobile access devices to drain at a much faster rate. Accordingly, the batteries must be charged or changed more frequently.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for generating clocks for standby mode operation in a mobile communication device in a mobile communication device. Aspects of the invention may provide a method for reducing power while in standby mode, which may comprise monitoring for an occurrence of at least one event requiring a transition out of a standby mode while utilizing a lower frequency, less accurate, and low power standby clock signal while operating in the standby mode. In response to receiving at least one event, a first and/or a second clock signal may be enabled, which has higher frequency and better accuracy and consumes more power than the low power clock signal. After receiving the event, an identity of the received event may be determined. If the first and/or second clock signal is enabled, it/they may be disabled in order to enter the standby mode.

In response to receiving at least one event requiring a transition back to the standby mode, transitioning back to the standby mode utilizing the low power standby clock signal while in the standby mode. The first clock signal and/or the second clock signal may be consumed by at least one processing device, which may be, for example, a main processor. The first clock signal may be generated by an off-chip clock source, which may be, for example, a voltage controlled crystal oscillator (VCXO). The second clock signal may be generated by an on-chip clock source, which may be, for example, a main phase lock loop.

Another embodiment of the invention may provide a machine-readable storage, having stored thereon, a computer program having at least one code section executable by a machine, thereby causing the machine to perform the steps as described above for generating a clock signal for standby mode operation in a mobile communication device.

Another embodiment of the invention provides a system for reducing power while in standby mode. The system may comprise at least one processor that monitors for an occurrence of at least one event that requires a transition out of the standby mode while utilizing a low power standby clock signal while in the standby mode. In response to receiving at least one event, the processor may determine an identity of the received event and may enable a first and/or a second clock signal that consumes more power than the low power standby clock signal.

The processor may be adapted to disable the first and/or the second clock signal if the first and/or second clock signal is enabled and it is necessary to enter the standby mode. The low power standby clock signal is utilized while in the standby mode. In response to receiving at least one event requiring a transition back to the standby mode, the processor may transition back to the standby mode, which utilizes the low power standby clock signal while in the standby mode. The processor may be adapted to consume the first clock signal and/or said second clock signal while it is not in the standby mode. An off-chip clock source such as a voltage controlled crystal oscillator (VCXO) may be utilized to generate the first clock signal. An on-chip clock source such as a main phase lock loop may be utilized to generate the second clock signal.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may reduce power while in standby mode and may comprise monitoring for an occurrence of at least one event requiring a transition out of a standby mode while utilizing a low power clock signal while operating in the standby mode. In response to receiving the event, a first and/or a second clock signal may be enabled, which consumes more power than the low power clock signal. After receiving the event, an identity of the received event may be determined. If the first and/or second clock signal is enabled, it/they may be disabled in order to re-enter the standby mode, which utilizes the low power clock signal while in standby mode.

Figure 1:
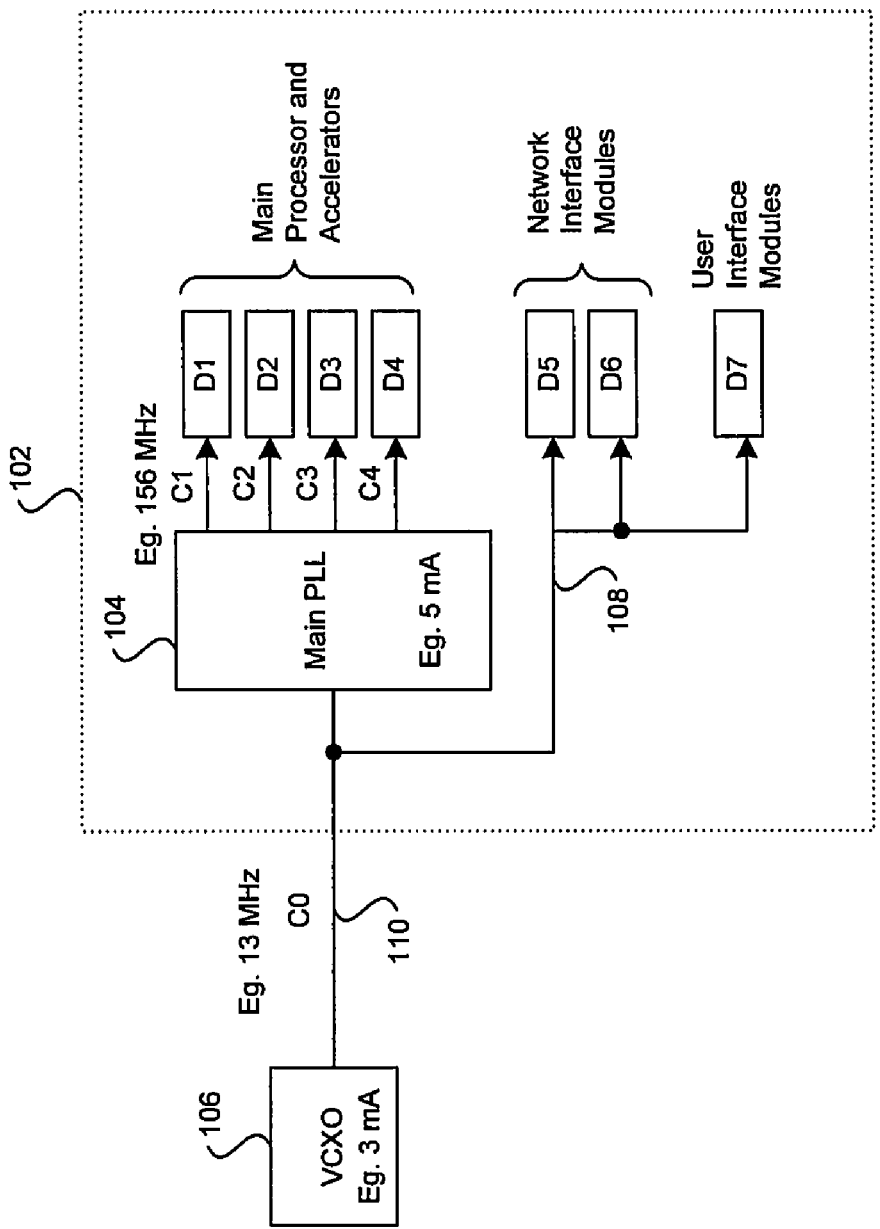
FIG. 1 is a block diagram of an exemplary system that may be utilized to minimize the amount of power that is consumed.
Figure 2:
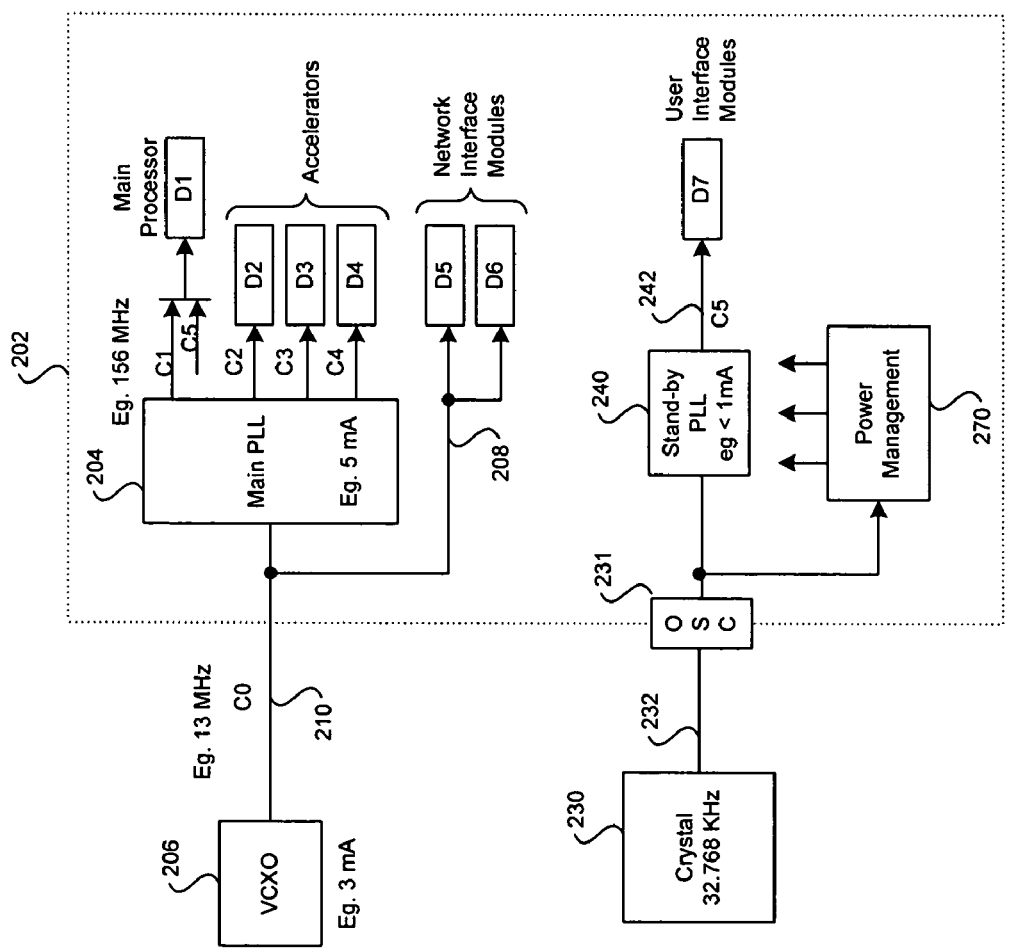
FIG. 2 is a block diagram of an exemplary system that may be utilized in connection with generating clocks for standby mode for a mobile communication device, in accordance with an embodiment of the invention.

FIG. 2 is a block diagram of an exemplary system that may be utilized in connection with generating clocks for standby mode for a mobile communication device, in accordance with an embodiment of the invention. Referring to FIG. 2, there is shown a chip 202, an external VCXO 206, a watch crystal 230, and an oscillator 231. In addition to the main PLL 204 and bypass clock signal 208, the chip 202 further comprises a stand-by phase lock loop (PLL) 240 and a power management block 270.

The main PLL 204 generates a plurality of clock signals C1, C2, C3, C4. Clock signal C1 may be coupled to a central processor D1. The device D1 may also be coupled to a clock signal C5 that is generated by the stand-by PLL 240. Clock signals C2, C3, and C4 are coupled to devices D2, D3, and D4, respectively. Signal 208 which is generated by the VCXO 206 and tapped from reference clock (C0) signal 210 may be coupled to devices D5 and D6. Devices D2, D3, and D4 may be accelerators or other types of processors and devices D5 and D6 may be network interface modules.

The watch crystal 230 may be generally found in virtually all mobile communication devices. The frequency of the watch clock may be 32.768 KHz where $2^{15}$ ticks of the clock indicate exactly 1 second elapsed. As a result, all of these mobile communication devices have it to keep track of the watch time. Compared to the VCXO 206, the operating frequency and the accuracy of the watch crystal 230 is significantly less, and as a result consumes a negligible amount of power. The oscillator (OSC) 231 may be utilized to generate a clock signal from the VCXO 206. Notwithstanding, although the oscillator 231 is shown integrated within the chip 202, the invention is not so limited. Accordingly, in another embodiment of the invention, the oscillator 231 may be coupled so that it resides outside the chip 202.

The frequency and accuracy requirements for the stand-by PLL 240 are much less than those on the main PLL 204. Its frequency may be only 7.3728 MHz (225*32.768 KHz), for example. Thus it may be designed to draw significantly less power than the main PLL 204. For example, the main PLL 204 may draw in excess of about 5 mA while the stand-by PLL 240 draws less than about 1 mA. In this regard, the stand-by PLL 240 may remain on during normal operation and during standby operating mode.

The power management block 270 comprises suitable logic circuitry and/or code that may be adapted to detect the occurrence of certain events and based on an identity of a detected event, may turn ON or OFF VCXO 206 and/or the main phase lock loop 204. Hence, during standby mode, the VCXO 206 and the main PLL 204 may be turned OFF and the clock signal is supplied by watch crystal 230. The power management block 270 may be adapted to turn ON/OFF or enable/disable the voltage controlled crystal oscillator 206 (VCXO) and/or the main PLL 204, in addition, it also wakes up devices such as the main processor.

The power management block 270 may wait for the occurrence of events such as a wake-on-LAN event, hibernate event or a standby mode event, which will cause a processor or device to enter a wakeup mode or a sleep mode. These events may require the processor or other device to wakeup or transition from a low power operating state to a normal operating state, which requires consumption of additional power. The latter operating state may require more stringent timing requirements, which consumes more power. A wake-on-LAN event may be received when a personal computer (PC), which is connected to the communication media, has data to send to the media, for example. A wake up event may be received when a key on the keypad of a wireless telephone is depressed. A standby mode event may be triggered when there is no activity during a preset period. Accordingly, aspects of the invention utilize the lower frequency, less accurate, and low power stand-by PLL 240 to provide a sufficiently good enough clock for event monitoring purposes. As a result, one other clock source is provided for event monitoring at substantially lower power.

Figure 3:
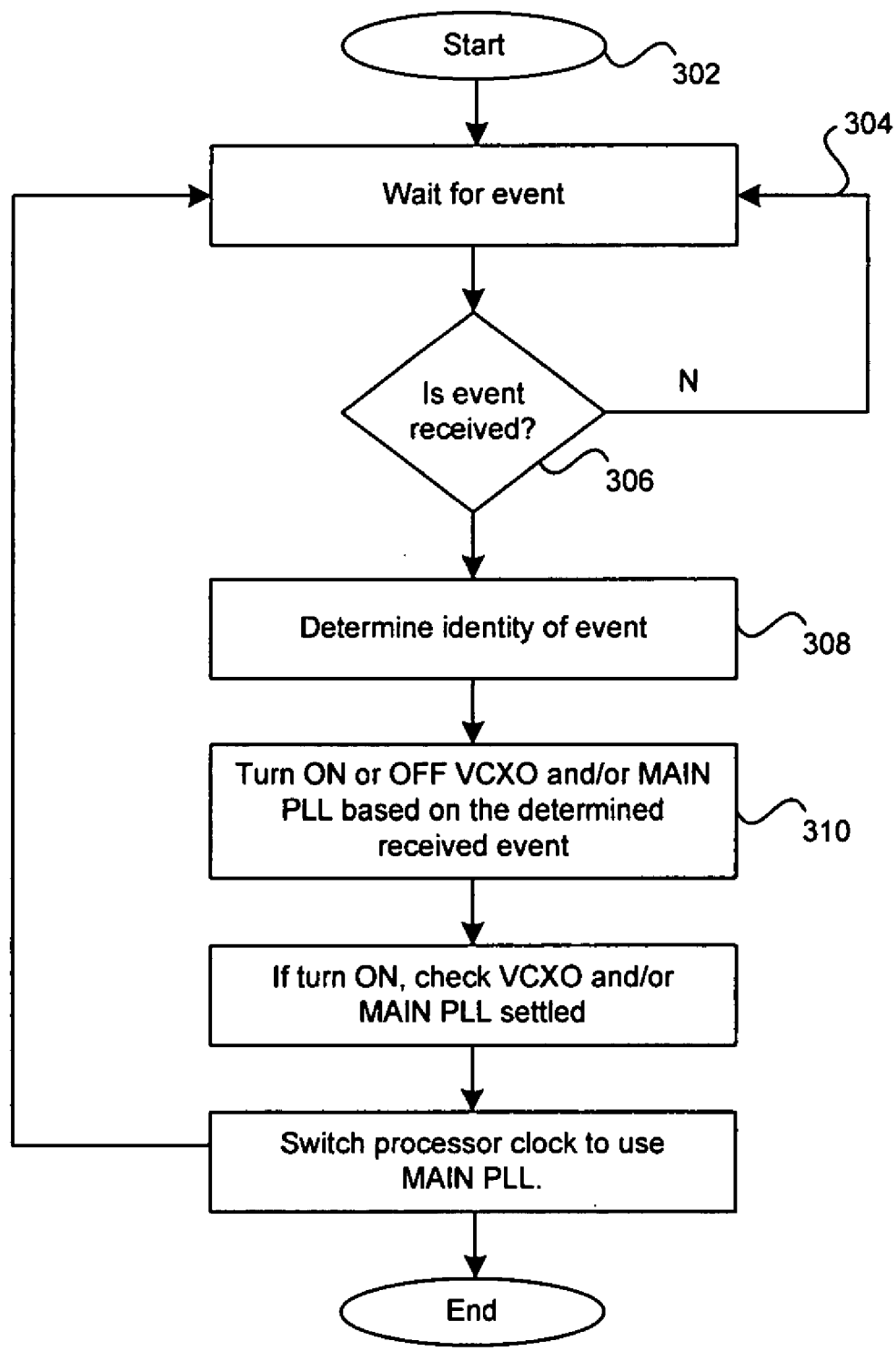
FIG. 3 is a flow chart illustrating exemplary steps that may be utilized for switching clock signals during a standby mode operation in a communication device in accordance with an embodiment of the invention.

FIG. 3 is a flow chart illustrating exemplary steps that may be utilized for switching clock signals during a standby mode operation in a communication device in accordance with an embodiment of the invention. Referring to FIG. 3, the exemplary steps start at step 302. Subsequently, in step 304, there is a wait for an event to occur. In step 306, it is determined whether an event is received. If no event is received, then control passes back to step 304. If an event is received, then in step 308, an identity of the received event is determined. In step 310, based on the determined identity, the VCXO 206 and/or the main PLL 204 may be turned ON or OFF in order to optimize power consumption.

In an illustrative embodiment of the invention, initially, a device such as a cellular telephone may be in a standby low power operating state where a watch clock is supplying the clock signal and a main PLL 204 and VCXO 206 are OFF. A user of the cellular telephone desires to dial a directory number. The pressing of a numeric key on a keypad of the cellular telephone may trigger the occurrence of a keypad-activated event. The power management block 270 may detect the occurrence of the keypad-activated event triggered by the pressing of the numeric key on the keypad. This wakes up the cellular telephone's processor such as device D1, and causes it to transition out of the standby low power operating state to a normal operating state. Accordingly, the main PLL 204 and/or VCXO 206 may be turned ON in order to provide the clock signals for normal operation. In operation, it takes time for the VCXO 206 and main PLL 204 to settle after it is turned on. During the settling time, the processor may utilize the clock C5 generated by the stand-by PLL 240 to process the on-going keypad events.

In response to detecting the keypad-activated event, the power management block may send a signal such as an interrupt signal to the cellular telephone's processor indicating that the cellular telephone's processor should wakeup. The power management block may then send a signal to the main PLL 204 and the VCXO 206, which indicates that the main PLL 204 and the VCXO 206 should be powered ON, and start supplying clock signals to a transmitter device since a user of the cellular telephone is dialing a directory number. The main PLL 204 and the VCXO 206 will remain ON during normal operation and at some time after the cellular telephone call is terminated, the cellular telephone may enter the standby mode of operation. As a result, the main PLL 204 and VCXO 206 may be powered OFF, thereby reducing the amount of power that is consumed. Aspects of the invention therefore optimizes the consumption of power by turning ON the main PLL 204 and VCXO 206 during periods when they are required and turns them off in periods when they are not required.

In another illustrative embodiment of the invention, a device such as a cellular telephone may be used to connect a PC or laptop to a ubiquitous cellular network. Most of the time, the device is in a standby low power operating state where the stand-by PLL 240 is supplying the clock signal and a main PLL 204 and VCXCO 206 are OFF. In an instant, a user may want to send an outgoing text message from the PC, which is destined for the cellular telephone. The outgoing text message from the PC may trigger the occurrence of an event such as a "message from host" event. The power management block 270 may detect the occurrence of the triggered "message from host" event. The outgoing message event may require the cellular telephone's processor to wake up and causes it to transition out of its standby low power operating state to a normal operating state. Accordingly, the main PLL 204 and/or VCXO 206 may be turned ON in order to provide the clock signals for normal operation. During the time the VCXO 206 and the main PLL 204 settles, the processor does not lose anything from the host because the clock from the stand-by PLL 240 keeps it running.

In response to detecting the message event, the power management block may send a signal such as an interrupt signal to the cellular telephone's processor indicating that the cellular telephone's processor should emerge from its current wakeup state. The power management block may then send a signal to the main PLL 204 and the VCXO 206, which indicates that the main PLL 204 and the VCXO 206 should be powered ON, and start supplying clock signals to a transmitter device since the cellular telephone has a message to send. The main PLL 204 and the VCXO 206 will remain ON during normal operation and at some time after the cellular telephone has completed sending the message, the cellular telephone may enter the standby operating mode. As a result, the main PLL 204 and VCXO 206 may be powered OFF, thereby reducing the amount of power that is being consumed.

Since the watch clock is generally present in virtually all the mobile systems, and is sufficient for event monitoring, no additional external circuitry needs to be added to existing system designs. After the VCXO 206 and/or main PLL is turned ON, an event may be generated, which indicates that the VCXO 206 and/or the main PLL 204 should be turned OFF. Turning ON the VCXO 206 and/or main PLL 204 only during normal operation, and turning OFF the VCXO 206 and/or main PLL 204 for low power modes may optimally handle power consumption in a communication device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for reducing power while in standby mode, the method comprising:
monitoring for an occurrence of at least one event requiring a transition out of the standby mode while utilizing a low power standby clock signal while in the standby mode, wherein said low power standby clock signal is generated by an off-chip clock source; and
upon receiving said at least one event, enabling one or both of a first clock signal and a second clock signal that consumes more power than said low power standby clock signal, said low power standby clock signal having a lower frequency and lower accuracy than said first clock signal and said second clock signal, wherein said first clock signal and said second clock signal are generated by a clock source on said chip.

2. The method according to claim 1, comprising determining an identity of said at least one received event.

3. The method according to claim 1, comprising if said at least one of said first clock signal and said second clock signal is enabled, disabling said at least one of said first and said second clock signal.

4. The method according to claim 1, comprising, responsive to receiving at least one event requiring a transition back to the standby mode, transitioning back to the standby mode utilizing said low power standby clock signal while in the standby mode.

5. The method according to claim 1, comprising consuming said at least one of said first clock signal and said second clock signal by at least one processing device.

6. The method according to claim 5, wherein said at least one processing device is a main processor.

7. The method according to claim 1, comprising generating said at least one of said first clock signal by an off-chip clock source.

8. The method according to claim 7, wherein said off-chip clock source has a higher frequency and a greater accuracy than said low power standby clock signal.

9. The method according to claim 1, wherein said on-chip clock source is a main phase lock loop.

10. A machine-readable storage having stored thereon, a computer program having at least one code section for reducing power while in standby mode, the at least one code section executable by a machine for causing the machine to perform steps comprising:
    monitoring for an occurrence of at least one event requiring a transition out of the standby mode while utilizing a low power standby clock signal while in the standby mode, wherein said low power standby clock signal is generated by an off-chip clock source; and
    upon receiving said at least one event, enabling one or both of a first clock signal and a second clock signal that consumes more power than said low power standby clock signal, said low power standby clock signal having a lower frequency and lower accuracy than said first clock signal and said second clock signal, wherein said first clock signal and said second clock signal are generated by a clock source on said chip.

11. The machine-readable storage according to claim 10, comprising determining an identity of said at least one received event.

12. The machine-readable storage according to claim 10, comprising if said at least one of said first clock signal and said second clock signal is enabled, disabling said at least one of said first and said second clock signal.

13. The machine-readable storage according to claim 10, comprising, responsive to receiving at least one event requiring a transition back to the standby mode, transitioning back to the standby mode utilizing said low power standby clock signal while in the standby mode.

14. The machine-readable storage according to claim 10, comprising consuming said at least one of said first clock signal and said second clock signal by at least one processing device.

15. The machine-readable storage according to claim 14, wherein said at least one processing device is a main processor.

16. The machine-readable storage according to claim 10, comprising generating said at least one of said first clock signal by an off-chip clock source.

17. The machine-readable storage according to claim 16, wherein said off-chip clock source has a higher frequency and a greater accuracy than said low power standby clock signal.

18. The machine-readable storage according to claim 10, wherein said on-chip clock source is a main phase lock loop.

19. A system for reducing power while in standby mode, the system comprising:
    at least one processor that monitors for an occurrence of at least one event requiring a transition out of the standby mode while utilizing a low power standby clock signal while in the standby mode, wherein said low power standby clock signal is generated by an off-chip clock source; and
    upon receiving said at least one event, said at least one processor enables one or both of a first clock signal and a second clock signal that consumes more power than said low power standby clock signal, said low power standby clock signal having a lower frequency and lower accuracy than said first clock signal and said second clock signal, wherein said first clock signal and said second clock signal are generated by a clock source on said chip.

20. The system according to claim 19, wherein said at least one processor determines an identity of said at least one received event.

21. The system according to claim 19, wherein said at least one processor disables said at least one of said first and said second clock signal, if said at least one of said first clock signal and said second clock signal is enabled.

22. The system according to claim 19, wherein, responsive to receiving at least one event requiring a transition back to the standby mode, wherein said at least one processor transitions back to the standby mode utilizing said low power standby clock signal while in the standby mode.

23. The system according to claim 19, wherein said at least one processor consumes said at least one of said first clock signal and said second clock signal by at least one processing device.

24. The system according to claim 23, wherein said at least one processing device is a main processor.

25. The system according to claim 19, comprising an off-chip clock source that generates said at least one of said first clock signal.

26. The system according to claim 25, wherein said off-chip clock source has a higher frequency and a greater accuracy than said low power standby clock signal.

27. The system according to claim 19, wherein said on-chip clock source is a main phase lock loop.

\* \* \* \* \*